United States Patent
Travnicek et al.

(10) Patent No.: US 9,752,688 B2
(45) Date of Patent: Sep. 5, 2017

(54) DOUBLE-PLATE GATE VALVE, SHUT-OFF PLATE, AND METHOD FOR SEALING A DOUBLE-PLATE GATE VALVE

(71) Applicant: Z&J Technologies GmbH, Dueren (DE)

(72) Inventors: Roland Travnicek, Dueren (DE); Peter Weidgang, Dueren (DE); Ingo Wirtz, Eschweiler (DE)

(73) Assignee: Z&J Technologies GmbH, Dueren (DE)

( * ) Notice: Subject to any disclaimer, the term of this patent is extended or adjusted under 35 U.S.C. 154(b) by 0 days.

(21) Appl. No.: 15/072,972

(22) Filed: Mar. 17, 2016

(65) Prior Publication Data

US 2016/0281860 A1 Sep. 29, 2016

(30) Foreign Application Priority Data

Mar. 26, 2015 (DE) .................. 10 2015 104 555

(51) Int. Cl.
*F16K 3/18* (2006.01)

(52) U.S. Cl.
CPC ........... *F16K 3/18* (2013.01); *Y10T 137/0318* (2015.04)

(58) Field of Classification Search
CPC . F16K 3/18; Y10T 137/0318; Y10T 137/0514
USPC ........ 251/326–329, 337, 193, 195, 175–176; 137/242, 246–246.12, 15.23, 1
See application file for complete search history.

(56) References Cited

U.S. PATENT DOCUMENTS

| | | | | |
|---|---|---|---|---|
| 1,421,687 A | * | 7/1922 | Haynes | ................ F16K 3/0254 251/176 |
| 1,836,374 A | * | 12/1931 | Kelly | ...................... F16K 3/184 137/242 |
| 2,230,600 A | | 2/1941 | Olson | |
| 2,571,826 A | * | 10/1951 | Boyd | ....................... F16K 3/14 251/175 |

(Continued)

FOREIGN PATENT DOCUMENTS

| DE | 711187 C | 8/1941 |
|---|---|---|
| DE | 1230279 B | 12/1966 |

(Continued)

OTHER PUBLICATIONS

German Patent and Trade Mark Office, Office Action for Application No. 102015104555.9, dated Jan. 5, 2016, 10 pages, Germany.

(Continued)

*Primary Examiner* — John Bastianelli
(74) *Attorney, Agent, or Firm* — Alston & Bird LLP (57) ABSTRACT

A double-plate gate valve is provided for fittings of industrial plants wherein the double-plate gate valve comprises a housing having two shut-off plates inside the housing the shut-off plates being displaceable between an open and a closed position. Spring elements, such as disc spring packs, are arranged between the shut-off plates pressing the shut-off plates in the closed position against sealing surfaces arranged on the housing such that the entire sealing force required for sealing is provided by the spring elements. Also provided in stand-alone form is a shut-off plate for use in the double-plate gate valve. A method for sealing the double-plate gate valve using the shut-off plates is also provided.

7 Claims, 6 Drawing Sheets

(56) References Cited

U.S. PATENT DOCUMENTS

| | | | | |
|---|---|---|---|---|
| 2,660,397 | A * | 11/1953 | Volpin | F16K 3/36 137/246.12 |
| 2,668,685 | A | 2/1954 | Ocker | |
| 3,305,208 | A * | 2/1967 | Bredtschneider | F16K 1/482 251/176 |
| 3,368,792 | A | 2/1968 | Schertler | |
| 3,478,771 | A * | 11/1969 | Johnson | F16K 3/02 137/242 |
| 3,524,467 | A * | 8/1970 | Worley | F16K 3/188 137/340 |
| 3,842,861 | A * | 10/1974 | Jandrasi | F16K 3/10 137/613 |
| 4,157,169 | A * | 6/1979 | Norman | F16K 3/188 251/167 |
| 4,381,100 | A * | 4/1983 | Schoenberg | F16K 3/188 137/554 |
| 5,087,017 | A * | 2/1992 | Sawa | F16K 51/00 251/175 |
| 6,845,783 | B1 * | 1/2005 | Sheppard | F16K 3/18 137/243 |
| 7,600,528 | B2 | 10/2009 | Brzoska et al. | |
| 9,347,569 | B2 * | 5/2016 | Kuboth | F16K 27/047 |
| 9,416,881 | B2 | 8/2016 | Takeda et al. | |
| 2014/0231691 | A1 | 8/2014 | Takeda et al. | |

FOREIGN PATENT DOCUMENTS

| | | |
|---|---|---|
| DE | 1945901 A1 | 9/1970 |
| DE | 4117577 A1 | 12/1992 |
| EP | 1561980 A1 | 8/2005 |

OTHER PUBLICATIONS

German Patent and Trade Mark Office, Office Action for Application No. 102015104555.9, dated Jan. 5, 2016, 7 pages, Germany. (English translation only.).

* cited by examiner

DOUBLE-PLATE GATE VALVE, SHUT-OFF PLATE, AND METHOD FOR SEALING A DOUBLE-PLATE GATE VALVE

CROSS-REFERENCE TO RELATED APPLICATIONS

This application claims priority to and the benefit of German Application No. 10 2015 104 555.9, filed Mar. 26, 2015, the contents of which as are hereby incorporated by reference herein in their entirety.

BACKGROUND

Technical Field

The invention relates to a double-plate gate valve for fittings of industrial plants, in particular chemical and petrochemical plants, a circular shut-off plate for use in a double-plate gate valve as well as a method for sealing a double-plate gate valve in closed position.

Description of Related Art

Plate gate valves are employed in the chemical and petrochemical industry, in particular in so-called coking plants and serve the purpose of obturating the coking drum in which the coking takes place. Due to the high process temperatures and pressures, the employed valves need to be sealed accordingly.

BRIEF SUMMARY

The present invention is therefore based on the task of creating a double-plate gate valve featuring high tightness and simple construction. It is moreover a task of the present invention to provide a shut-off plate and a method for sealing a double-plate gate valve.

This task is solved by a double-plate gate valve as well as shut-off plates according to the pending claims, and a method for sealing a double-plate gate valve according to the pending claims.

The task is in particular solved by a double-plate gate valve for fittings of industrial plants, in particular chemical and petrochemical plants, comprising a housing having two shut-off plates inside the housing which are displaceable between an open and a closed position, wherein spring elements such as disc spring packs are arranged between the shut-off plates, pressing the shut-off plates in the closed position against sealing surfaces arranged on the housing such that the entire sealing force required for sealing is provided by the spring elements.

An advantageous detail of the invention is in this case that the sealing force required for sealing is entirely applied by the spring elements clamped between the shut-off plates. Apart from the spring elements, the space between the shut-off plates may be free from built-in components. Thereby, the double-plate gate valve's construction is simplified and high tightness achieved.

In at least one embodiment, the housing comprises at least one sealing gas connection through which a sealing gas pressure may be applied to the inside of the housing. This results in an increase of the operational safety when the double-plate gate valve is in the closed position. In the case of failure of one or more spring elements and thus an associated deterioration of the sealing force, the sealing gas pressure is designed to compensate for the sealing force missing due to the failed elements.

In yet another embodiment, the housing comprises an upper housing sealing seat and a lower housing sealing seat. These comprise sealing surfaces against which the shut-off plates are pressed. In at least this embodiment, the upper housing sealing seat is connected to the housing to be detachable so as to enable access to the shut-off plates. This represents a particularly simple maintenance option since the housing is thus not required to be opened, and the maintenance opening created in this way is sufficiently large to remove at least the upper shut-off plate, in particular both shut-off plates without opening the housing.

In a further embodiment, the upper housing sealing seat comprises a multiple seal which forms part of the sealing surface against which the upper shut-off plate is pressed in the closed position. The tightness of the housing's inside is thereby additionally improved, in particular with respect to gases generated during the coking.

It is further advantageous for the upper housing sealing seat to feature a sealing and scraping edge on its radial inner side which, in the closed position, rests against the upper shut-off plate and thus forms a metal seal. When the upper shut-off plate is displaced, for example in the transition from the closed to the opened position, contaminations can thus be scraped off the upper shut-off plate. In addition, the upper shut-off plate's tightness in the closed position can be improved.

In yet another exemplary embodiment, the shut-off plates are inserted to be movable in a spectacle-shaped plate box displaceable inside the housing. This decoupling of displacing and sealing element offers numerous advantages. On the one hand, the shut-off plates in the intended industrial plants are exposed to extreme thermal loads. Thanks to the decoupling of plate box and shut-off plate, the thermal distortion of the plate box is minimized, and thus the guide within the housing is not impaired. Furthermore, different materials for the plate box and the shut-off plate may in this way be selected so as to account for the special requirements in the respective industrial plant. Loosely inserting the shut-off plates finally facilitates their maintenance and replacement.

Advantageously, a gap is formed between the shut-off plates, its smallest width being less than the thickness of one of the shut-off plates at its outer circumference. This increases the double-plate gate valve's operational safety since in the event of the sealing force deteriorating, for example due to individual spring elements failing, the plates will not deflect excessively.

Advantageously, to an outer edge of the plate box, a distal end of an actuating rod is further mounted which extends within the housing along the shut-off plate's displacement direction away from the plate box and by means of which the plate box and the shut-off plates mounted therein are displaceable. This reduces the assembly and maintenance effort of the double-plate gate valve.

In the context of the invention, a circular shut-off plate for use in a double-plate gate valve is further proposed. The inventive shut-off plate exhibits the following features: a flat outer side; a stop area, that is concentric to the plate circumference, on the inner side, the surface of which runs in parallel to the outer side; a plate thickness radially decreasing from the stop area toward the outside; and spring element seats for receiving spring elements regularly arranged along the plate circumference in the edge area on the inner side of the shut-off plate.

The inventive shaping of the shut-off plates results in further advantages.

The stop area provided in the center of the shut-off plates functions as a safety element, since in the event of too high a load from outside the plates will contact in the stop area and further pushing be prevented.

Furthermore, due to the shut-off plate's reduced thickness toward the edge, less material is needed, whereby costs are saved.

Finally, the radial tapering of the shut-off plates promotes a convex curvature of the shut-off plates upon pressure application in the closed position, which results in improved sealing with respect to the sealing seats.

Lastly, a method for sealing a double-plate gate valve is proposed within the context of the invention, in that the shut-off plates are spread apart by spring elements such as spring disc packs clamped in between them and are pressed against respective associated sealing surfaces on the double-plate gate valve's housing, wherein a sealing gas pressure is applied to the space between the shut-off plates for increasing the sealing force.

Thus, in the inventive sealing method of the double-plate gate valve in the closed position, the sealing force applied by the spring elements is further increased by applying pressure to the housing interior by means of a sealing gas, which constitutes an additional safety measure during operation.

BRIEF DESCRIPTION OF THE FIGURES

Herein-below, the invention will be described also with respect to further features and advantages using exemplary embodiments which will be described in more detail based on the figures.

Shown are in.

DETAILED DESCRIPTION OF VARIOUS EMBODIMENTS

Figure 1:
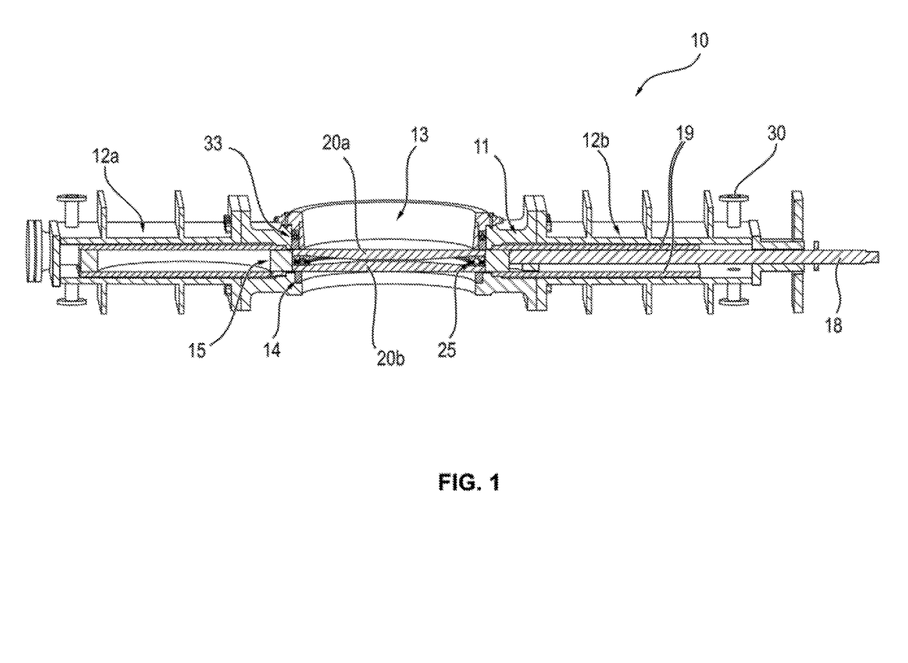
FIG. 1 a section of a double-plate gate valve according to an inventive exemplary embodiment in a closed position along the central axis which is parallel to the plate displacement direction.

The double-plate gate valve according to FIG. 1 is employed in coking plants, in particular in delayed coker plants, in which coking drums are equipped with shut-off devices. Specifically, the double-plate gate valve illustrated in FIG. 1 is used for obturating the lower outlet opening of a coking drum (bottom de-heading). It is also possible for the inventive concept to be used in a shut-off device employed for opening and closing the upper outlet opening of the coking drum (top de-heading). Moreover, the inventive concept, respectively the invention in general, may be used in conjunction with shut-off devices employed in other industrial sectors such as ethylene, FCCU, phosgene, etc. The double-plate gate valve according to the inventive exemplary embodiment, respectively the invention in general, may be used in general as a shut-off device in chemical and petrochemical plants.

FIG. 1 shows a section of a double-plate gate valve 10 in the closed position. The double-plate gate valve 10 features a housing 11 to which two hoods 12a and 12b are flange-mounted. The hoods 12a, 12b and the housing 11 enclose a housing interior within which the elements required for the double-plate gate valve's function are arranged. Shut-off plates 20a and 20b, between which disc spring packs 25 are arranged, are disposed between an upper housing sealing seat 13 and a lower housing sealing seat 14. The upper housing sealing seat 13 comprises in its radial outer area a multiple seal 33 facing the upper shut-off plate 20a which forms part of the sealing surface against which the upper shut-off plate 20a is pressed. The terms "upper" and "lower" here and hereafter refer to the positional relationships in FIG. 1.

The housing 11 features four gas connections 30. These may be used to introduce a sealing gas into the housing's 11 interior and to increase the pressure in the housing's 11 interior. However, other gas connections not shown in the figure may be provided for this purpose.

The shut-off plates 20a, 20b are inserted in a spectacle-shaped plate box 15. The plate box 15 comprises two openings, with one of the two openings being loaded with the shut-off plates 20a, 20b, and the other opening being empty. In the example according to FIG. 3, the shut-off plates 20a, 20b are disposed in the right-side, respectively generally rear opening in the closing direction. As an alternative, the shut-off plates 20a, 20b may be disposed in the left-side, respectively generally front opening in the closing direction depending on requirements.

The plate box 15 is displaceable along the direction formed by housing 11 and hoods 12a, 12b. The double-plate gate valve 10 may thus be moved between an open and a closed position. In FIG. 1, the double-plate gate valve 10 is shown in the closed position. The shut-off plates 20a, 20b are located in the passage openings between the upper housing sealing seat 13 and the lower housing sealing seat 14 and seal the same. In the open position, the empty box is located within the passage opening so that the same is open.

The plate box 15 is inserted between guiding plates 19 which encapsulate and guide the plate box 15. In this way, the ingress of contaminations into the housing interior may be avoided. For displacing the plate box 15, and the shut-off plates 20a and 20b inserted therein, between the open and closed positions, the plate box 15, at its right-side outer edge, is connected to an actuating rod 18 extending along the displacement direction and protruding out of the hood 12b. The actuating rod 18 transfers thrust and traction forces to the plate box 15, whereby the double-plate gate valve 10 can be moved between the open and closed positions. For this purpose, the actuating rod 18 may be connected to a drive that is not shown.

Figure 2:
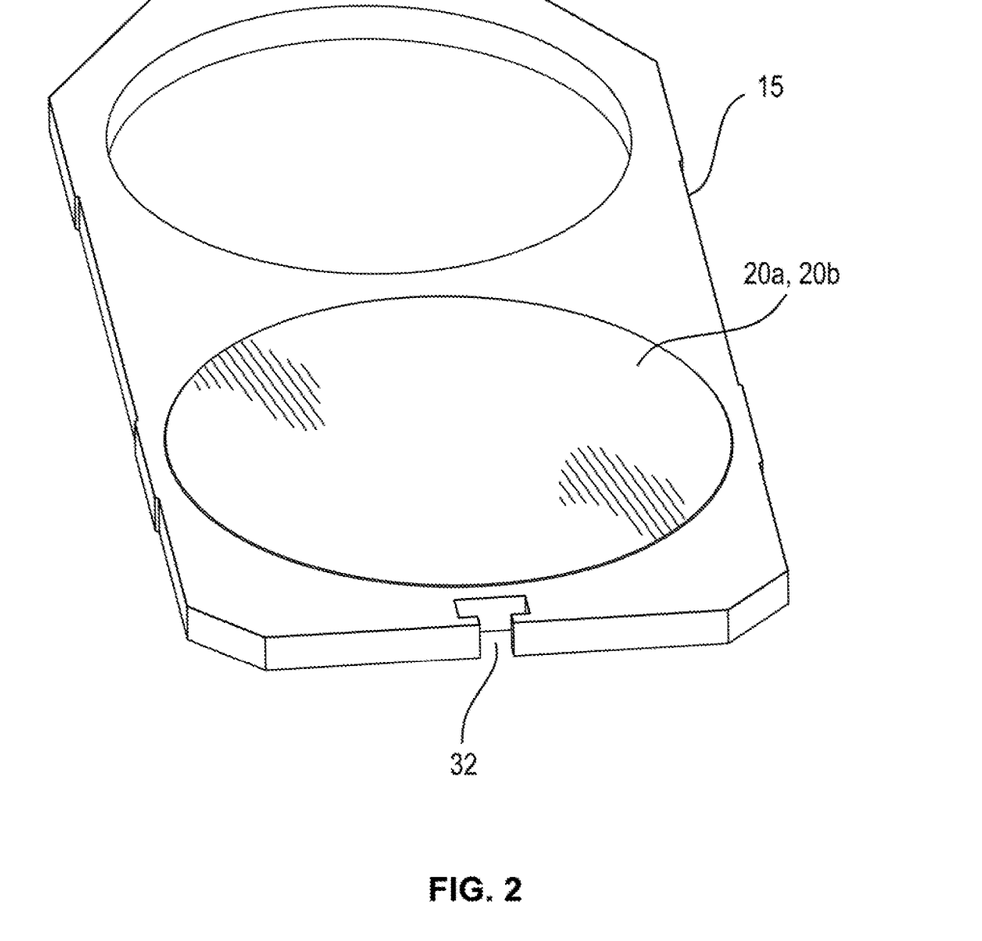
FIG. 2 a perspective view of a plate box according to an inventive exemplary embodiment.

FIG. 2 shows a perspective view of the plate box 15 having two openings. Into the rear opening in the closing direction, the pair of shut-off plates 20a, 20b is inserted. The front opening in the closing direction is empty. The shut-off plates may be exchanged. A dovetail connection 32, into which a complementary connection element of the actuating rod 18 is inserted, serves the purpose of connecting the plate box 15 and the actuating rod 18. Here, it becomes apparent that the actuating rod does not extend into the area between the shut-off plates 20a and 20b, but only up to an outer edge of the plate box 15. The weight of the double-plate gate valve 10 is thus reduced, on the one hand; on the other, a space between the shut-off plates 20a and 20b is not required to be provided for the actuating rod 10 or constructional elements associated with it.

Figure 3:
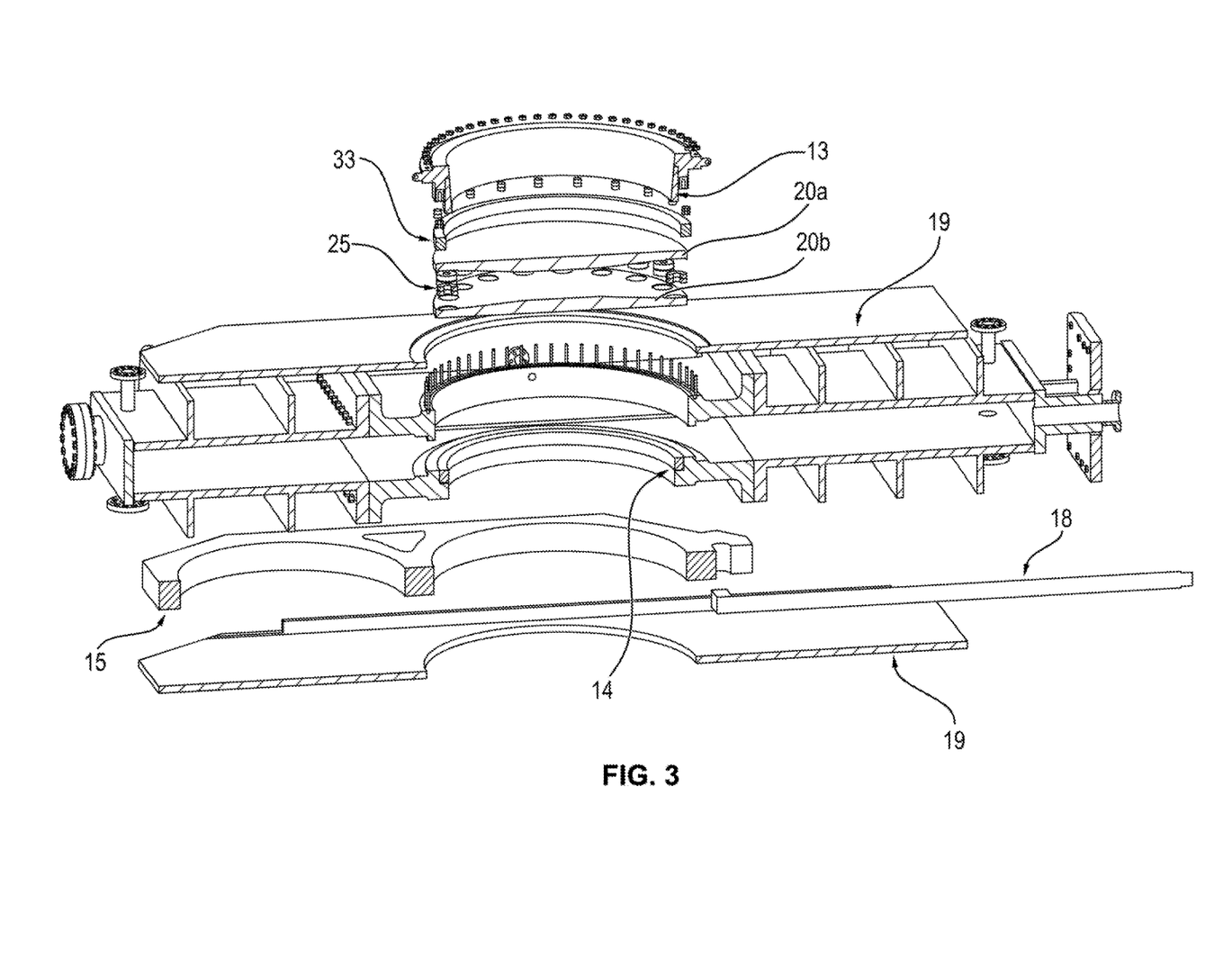
FIG. 3 an exploded view of the double-plate gate valve from FIG. 1.

The upper housing sealing seat 13 is screwed together with the housing 11 and can thus be detached from the housing 11. FIG. 3 shows an exploded view of the double-plate gate valve 10 in the same sectional view as in FIG. 1. The two shut-off plates 20a, 20b are exposed to extreme temperatures and need to be serviced at regular intervals. The detachable upper housing sealing seat 13 creates a particularly practicable solution for this.

Figure 4:
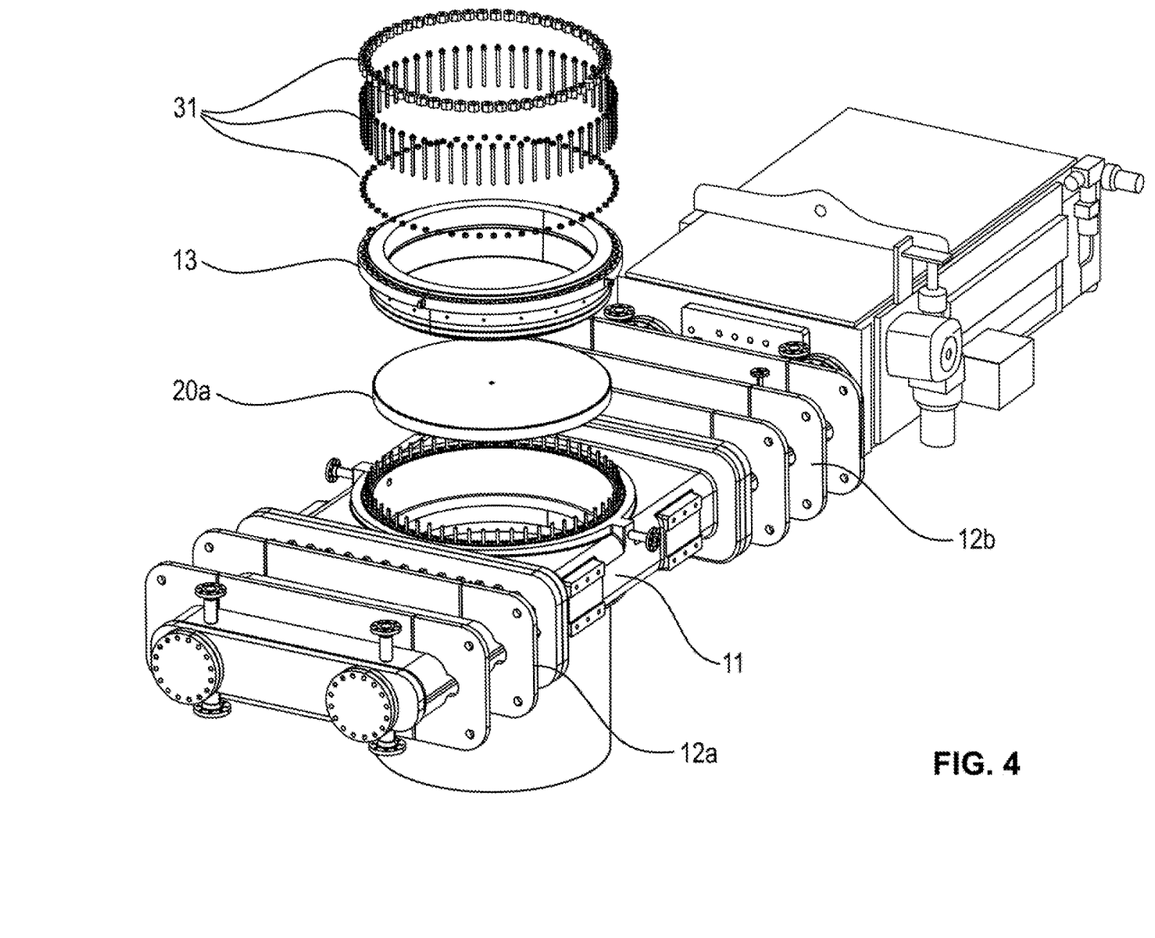
FIG. 4 a perspective exploded view of the upper sealing seat.

FIG. 4 shows a perspective view of the double-plate gate valve 10 having the upper housing sealing seat 13 detached as for example in the event of maintenance. The upper housing sealing seat 13 is attached to the housing 11 to be detachable by means of fastening means 31, in this case screws. As can be seen from FIG. 4, the hoods 12a, 12b are not required to be removed from the housing 11 for maintenance so as to get access to the shut-off plates 20a, 20b, on the contrary, all of the parts in need of maintenance such as gaskets in the sealing seats, shut-off plates 20a, 20b or spring elements 25 may be easily made accessible through the large opening.

Figure 5:
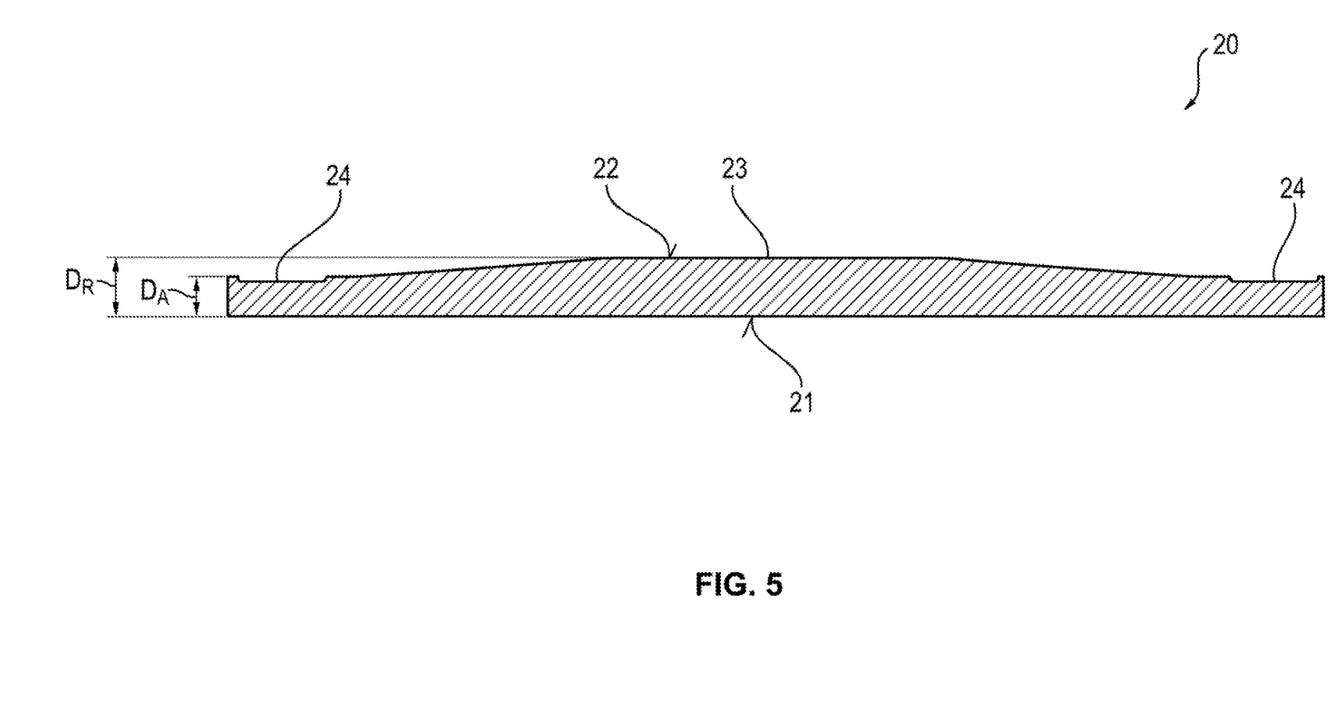
FIG. 5 a section of a shut-off plate according to an inventive exemplary embodiment.

In FIG. 5, a shut-off plate 20 is shown in a sectional view, the structure of which is identical to both the upper shut-off plate 20a and the lower shut-off plate 20b. The shut-off plate 20 is circular and features an outer side 21 and an inner side 22. Referred to as the outer side 21 is in this case always the plate side which, when in the installed state, is brought into contact with a housing sealing seat. Accordingly, the shut-off plate's 20 inner sides 22 are facing the opposite shut-off plate in the event of installation.

The outer side 21 of the shut-off plate 20 is smooth, since it needs to be sealed in the closed position by the housing sealing seat facing it. On the inner side in the plate center a stop area 23 is located featuring a circular shape that is concentric with the outer circumference of the shut-off plate 20. The stop area 23 constitutes in this case a stop plate area having a maximum stop thickness DA. The relation of the shut-off plate diameter RP to the stop area diameter RA, designated as RP:RA, preferably has a value of between 1.5:1 and 3:1. Starting from the stop area 23 the plate tapers radially outward to an edge thickness DR. The relationship of the stop thickness to the edge thickness DA:DR preferably has a value of between 1.5:1 and 2:1.

Uniformly arranged along the circumference, spring element seats 24 are disposed on the inner side 22 in the edge area of the shut-off plate 20. The spring element seats 24 serve the purpose of receiving the spring elements 25 pressing the shut-off plates 20 apart and against the respective sealing seats. Preferentially, at least twelve, further preferentially at least 16 spring elements 25 are provided. Preferably, disc spring packs are used. Other spring types are possible. For instance, springs having a gas accumulator and a piston exerting the desired spring force when the gas storage is heated may be used. Usually one and the same spring type is used, e.g. disc spring packs. A parallel combination of different spring types is also possible, e.g. the disc spring packs and the springs having a gas accumulator described above. Particularly preferred, the total force applied by the spring elements is at least 400 kN, in particular at least 650 kN.

For the installation in a double-plate gate valve 10, a shut-off plate 20 just described above is inserted in the plate box 15 with its exterior side 21 downwards, its spring element seats 24 are provided with spring elements 25, and a second shut-off plate 20 is placed onto the provided spring elements 25 with its interior side 22 downwards.

Figure 6:
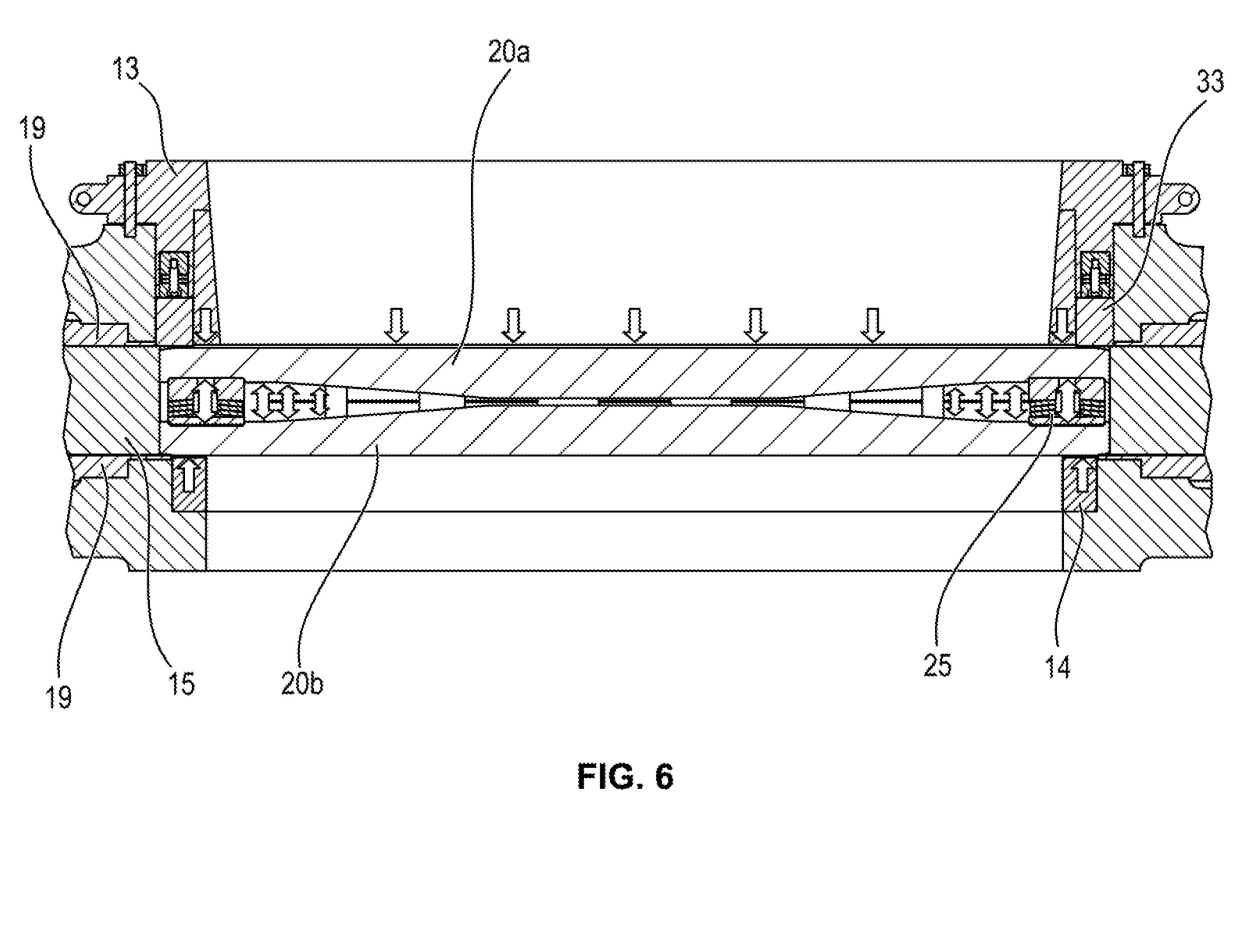
FIG. 6 a detailed view of the shut-off plates in the closed position of the double-plate gate valve from FIG. 1.

FIG. 6 shows a sectional view of the shut-off plates in this way inserted into the double-plate gate valve 10 in the closed position.

A gap is formed between the shut-off plates 20a, 20b. Due to the shut-off plates' shaping, this gap is narrowest in the region of the stop areas 23 since the shut-off plates 20a, 20b here have the greatest thickness (DA). The width of the gap between the shut-off plates in the stop area 23 is in this case smaller than the thickness of the shut-off plates 20a, 20b at their outer circumference (DR). Preferably, the gap's width has a value of between 0.5 mm and 10 mm, further preferred of between 1 mm and 8 mm, still further preferred of between 2 mm and 5 mm.

Upon pressure application from outside (indicated by the yellow arrows from above), pressure is exerted upon the upper shut-off plate 20a. The spring elements 25 arranged between the shut-off plates 20a, 20b withstand this pressure and press the shut-off plates 20a, 20b against their respect housing sealing seats. In the event of one or more spring elements 25 failing, the upper shut-off plate 20a may be deformed due to the pressure application from outside. In this case, the shut-off plates 20a, 20b will make contact in their stop areas 23. The stop areas 23 of the two shut-off plates 20a, 20b thus prevent the shut-off plates 20a, 20b from excessively deforming upon failure of the spring elements 25. Consequently, an excessive deterioration of the tightness which might lead to ingress of contaminations into the housing 11 of the double-plate gate valve 10 or a deflection of the shut-off plates 20a, 20b can be prevented and the safety of the double-plate gate valve 10 increased in this way.

The spring elements 25 clamped between the shut-off plates 20a, 20b force the two shut-off plates 20a, 20b apart. When the double-plate gate valve 10 is moved from the closed to the open position, the shut-off plates 20a, 20b are moved along the guiding plates 19 into the housing interior and the guiding plates 19 absorb the pressure of the spring elements 25. In the closed position, the shut-off plates 20a, 20b are pressed against the upper and lower sealing seats 13 and 14, and the opening is sealed in this manner.

Due to the shut-off plates 20a, 20b tapering radially in the radial direction, a convex deformation of the shut-off plates 20a, 20b in the closed position can be promoted. In this case, the plates will bulge outward when sealing gas pressure is applied to the housing 11, whereby the tightness with respect to the housing sealing seats is further increased. A sealing and scraping edge on the radial inner sides of the upper housing sealing seat 13 may in this case serve as an additional sealing. The shape of the sealing and scraping edge is adapted to the shut-off plate's 20a deformation, so that a particularly good sealing effect is achieved upon applying sealing gas pressure to the housing 11.

In the closed position, the operational safety may be further improved by applying sealing gas pressure to the housing 11. This offers the advantage, on the one hand, of being able to prevent the ingress of contaminations into the housing's 10 interior through potential leakages along the sealing seats. On the other, potential failure of spring elements and an associated deterioration of the sealing force can be counteracted as a precaution by an additional sealing gas application. In the event of spring elements failing, the missing sealing force may be applied by the sealing gas pressure. This serves as an additional safety measure and in addition increases the tightness of the double-plate gate valve 10.

LIST OF REFERENCE NUMERALS 10 double-plate gate valve
11 housing
12a hood
12b hood
13 upper housing sealing seat
14 lower housing sealing seat 15 plate box
18 actuating rod
19 guiding plates
20 shut-off plate
20a upper shut-off plate
20b lower shut-off plate
21 outer side
22 inner side
23 stop area
24 spring element seat
25 spring element
30 gas connection
31 32 dovetail connection
33 multiple seal

The invention claimed is:

1. Method for sealing a double-plate gate valve (10) using circular shut-off plates, said method comprising the steps of:
spreading apart shut-off plates (20a, 20b) of the double-plate gate valve via spring elements (25) clamped in between the shut-off plates (20a, 20b);
pressing via the spring elements (25) the shut-off plates (20a, 20b) against respective associated sealing surfaces on a housing (11) of the double-plate gate valve; and
applying a sealing gas pressure to a space between the shut-off plates (20a, 20b), wherein at least one of the two shut-off plates (20a, 20b) is convexly deformed upon the application of the sealing gas pressure.

2. Method according to claim 1, wherein each of the shut-off plates (20a, 20b) comprises:
a flat outer side (21);
a stop area (23) concentric to a circumference of each of the shut-off plates (20a, 20b) on an inner side (22), the stop area (23) having a surface that is parallel to the flat outer side (21);
a plate thickness radially decreasing from the stop area (23) toward an outside of each of the shut-off plates (20a, 20b);
spring element seats (24) for receiving spring elements (25) arranged along the plate circumference in an edge area on the inner side (22) of each of the shut-off plates (20a, 20b).

3. Method according to claim 2, wherein:
the shut-off plates (20a, 20b) are located inside the housing (11) and are displaceable, during spreading, between an open and a closed position, and the spring elements (25) arranged between the shut-off plates (20a, 20b) further provide the pressing of the shut-off plates (20a, 20b), in the closed position, against the respective associated sealing surfaces arranged on the housing (11), such that an entire sealing force required for sealing is provided by the spring elements (25).

4. Method according to claim 1, wherein:
the shut-off plates (20a, 20b) are located inside the housing (11) and are displaceable, during spreading, between an open and a closed position, and
the spring elements (25) arranged between the shut-off plates (20a, 20b) further provide the pressing of the shut-off plates (20a, 20b), in the closed position, against the respective associated sealing surfaces arranged on the housing (11), such that an entire sealing force required for sealing is provided by the spring elements (25).

5. Method according to claim 1, wherein the spring elements (25) are spring disc packs.

6. Method according to claim 3, wherein the spring elements (25) are spring disc packs.

7. Method according to claim 4, wherein the spring elements (25) are spring disc packs.

* * * * *